US010492211B2

United States Patent
Lee et al.

(10) Patent No.: US 10,492,211 B2
(45) Date of Patent: Nov. 26, 2019

(54) WIRELESS SOFTWARE-DEFINED NETWORKING

(71) Applicant: HEWLETT PACKARD ENTERPRISE DEVELOPMENT LP, Houston, TX (US)

(72) Inventors: Jung Gun Lee, Palo Alto, CA (US); Mostafa Abdulla Zahid Uddin, Norfolk, VA (US); Jean Tourrilhes, Palo Alto, CA (US); Souvik Sen, Palo Alto, CA (US); Manfred R. Arndt, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/032,073

(22) PCT Filed: Oct. 31, 2013

(86) PCT No.: PCT/US2013/067740
§ 371 (c)(1),
(2) Date: Apr. 26, 2016

(87) PCT Pub. No.: WO2015/065422
PCT Pub. Date: May 7, 2015

(65) Prior Publication Data
US 2016/0270101 A1 Sep. 15, 2016

(51) Int. Cl.
*H04W 72/12* (2009.01)
*H04W 76/15* (2018.01)
(Continued)

(52) U.S. Cl.
CPC ......... *H04W 72/1226* (2013.01); *H04L 41/02* (2013.01); *H04L 47/20* (2013.01);
(Continued)

(58) Field of Classification Search
None
See application file for complete search history.

(56) References Cited

U.S. PATENT DOCUMENTS 8,144,707 B2 3/2012 Zhang et al.
2006/0029073 A1* 2/2006 Cervello ........... H04W 74/0816
370/389
(Continued)

FOREIGN PATENT DOCUMENTS

| CN | 102084680 B | 6/2011 |
|---|---|---|
| CN | 103004167 A | 3/2013 |
| TW | 201227785 | 7/2012 |

OTHER PUBLICATIONS

International Search Report and Written Opinion, International Application No. PCT/US2013/067740, dated Jul. 29, 2014, pp. 1-10.
(Continued)

*Primary Examiner* — Chi H Pham
*Assistant Examiner* — Raul Rivas
(74) *Attorney, Agent, or Firm* — Hewlett Packard Enterprise Patent Department (57) ABSTRACT

The present disclosure is generally related to a method for wireless software-defined networking. The method includes establishing a wireless link between an access point of a network and a plurality of client devices. The method includes generating a time schedule. The time schedule allocates a time window to each of the plurality of client devices. Each time window defines when a plurality of client devices is allowed to communicate within the network via the access point.

18 Claims, 5 Drawing Sheets

(51) Int. Cl.
*H04W 72/04* (2009.01)
*H04W 74/04* (2009.01)
*H04L 12/24* (2006.01)
*H04L 12/813* (2013.01)
*H04W 24/08* (2009.01)
*H04W 88/08* (2009.01)

(52) U.S. Cl.
CPC ....... *H04W 24/08* (2013.01); *H04W 72/0446* (2013.01); *H04W 74/04* (2013.01); *H04W 76/15* (2018.02); *H04W 88/08* (2013.01)

(56) References Cited

U.S. PATENT DOCUMENTS

| | | | |
|---|---|---|---|
| 2006/0165103 A1 | 7/2006 | Trudeau et al. | |
| 2010/0115048 A1 | 5/2010 | Scahill | |
| 2010/0257094 A1 | 10/2010 | Srhiai et al. | |
| 2011/0085532 A1* | 4/2011 | Scherzer | H04W 28/18 370/338 |
| 2012/0166010 A1 | 6/2012 | Pai-Hsiang et al. | |
| 2012/0331088 A1 | 12/2012 | O'Hare et al. | |
| 2013/0094486 A1 | 4/2013 | Bhanage et al. | |
| 2014/0098682 A1* | 4/2014 | Cao | H04W 36/00835 370/252 |

OTHER PUBLICATIONS

Lalith Suresh, "Introducing Odin: An SDN Framework for Enterprise WLANS," Jul. 23, 2012, pp. 1-5.
S. Jose, "ADARA to Introduce SDN for End User Environments," Apr. 10, 2013, pp. 1-3, PR Newswire for Journalists.
Li et al., "Uplink Traffic Control in Home 802.11 Wireless Networks," ACM HomeNets 2011, pp. 55-60.
Jameson Blandford, "Wireless Network Head-to-Head: Cisco Vs. Meru", available online at <https://www.networkcomputing.com/wireless-infrastructure/wireless-network-head-head-cisco-vs-meru>, Nov. 17, 2006, 15 pages.

* cited by examiner

WIRELESS SOFTWARE-DEFINED NETWORKING

BACKGROUND

Software-defined networking (SDN) is a network architecture in which network control plane and policies are decoupled from network infrastructure and client devices, and placed in a logically centralized controller. SDN allows an administrator to orchestrate and automate control of network services, such as network components and applications through abstraction of a lower level functionality. An SDN controller in the SDN network makes decisions about how network traffic is processed by instructing devices within the SDN network to define forwarding behavior of data packets traveling across the SDN network to control and coordinate functionality such as traffic path, quality-of-service (QoS) and security, while also extending network policies out to client devices according to policies set by high-level policy or business logic. SDN allows the administrator to have direct control over the entire network, and make changes quickly and efficiently.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

The present disclosure is generally related to software-defined networking (SDN) in a wireless network. In a switched wired Ethernet local area network (LAN), the connection between a network edge and a client device is an isolated point-to-point link with full duplex capability (e.g., supports simultaneous transmission and reception), and uncontrolled transmissions from other devices do not affect the performance of the transmissions between the client device and network edge. A client device, as discussed herein, refers to an electronic device, such as a computer, laptop, tablet, smartphone, or mobile phone that is communicatively coupled to a network. However, in a wireless local area network (WLAN), transmission between an access point and a client device is less manageable, as traffic from other wireless devices may cause contention and interference. Thus, it can be more difficult to push a network policy to the client device or deliver an acceptable quality of experience (QoE) for the user of the client device. Examples of the present disclosure provide a method and system of setting network policies in a wireless network.

In a wireless network, a plurality of client devices may be communicatively coupled to an access point through a wireless link. Airtime with the wireless access point can be divided into time windows and allocated among the client devices such that each client device is able to communicate with the access point with reduced contention or interference from other devices. This approach allows a control layer of the wireless network to manage and set policies in a centralized manner to all associated client devices, such that the performance of each client device during its airtime window conforms to network policies. In other words, client devices are given their own time windows or a time window shared by a number of client devices so that they can communicate wirelessly within the network with reduced contention or interference from other devices, while also conserving power. The approach can be scaled according to centralized network policies and network activity of each client device.

A network edge may be a combination of hardware and software that includes a number of wireless access points, wireless routers, switches, gateways, and instructions processed to define the forwarding behavior of data packets and extend network policies out to client devices. Further, as used in the present specification and in the appended claims, the term "access point" is meant to be understood broadly as any wireless network edge point within a network and can apply equally to a wireless access point, wireless router, switches, gateway, or any other wireless networking device.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples. Further, as used in the present specification and in the appended claims, the term "a number of" or similar language is meant to be understood broadly as any positive number comprising 1 to infinity.

Figure 1:
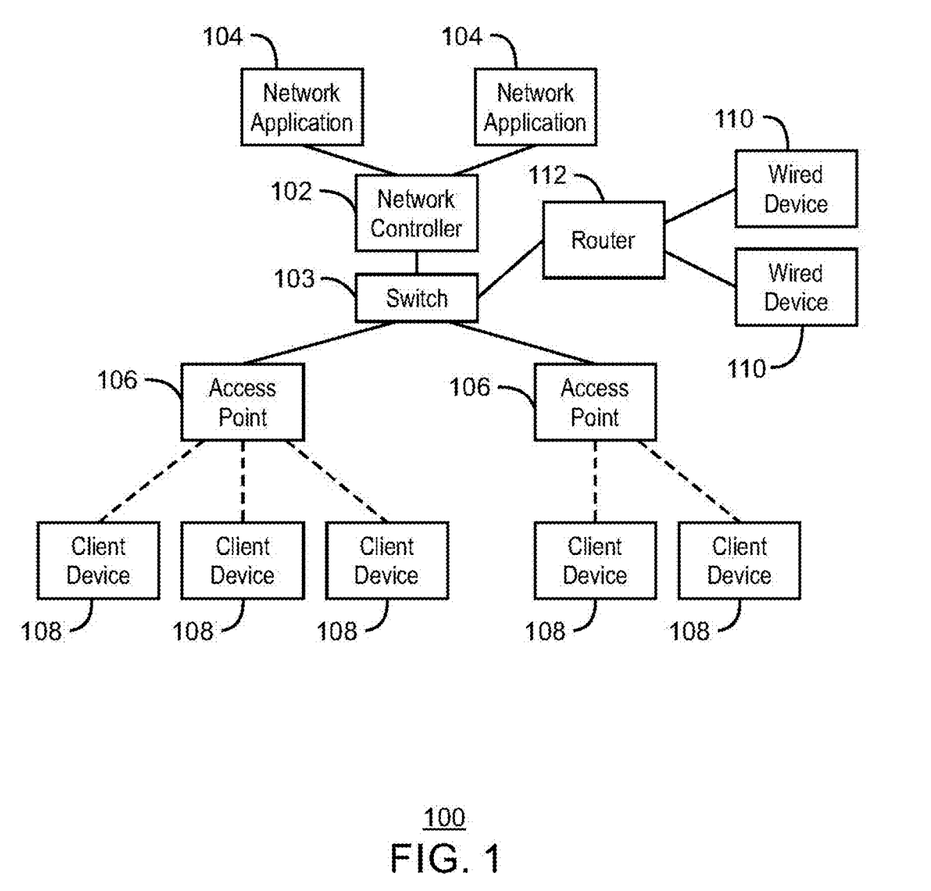
FIG. 1 is a block diagram of a network that includes wireless and wired communication devices, in accordance with examples of the present disclosure.

FIG. 1 is a block diagram of a network that includes wireless and wired communication devices, in accordance with examples of the present disclosure. The network 100 may include a network computing system that utilizes software-defined networking (SDN) infrastructure. For example, the network 100 may be a wireless local area network (WLAN), a wide area network (WAN), an enterprise private network, or a virtual private network (VPN), or combinations thereof. The network 100 can include a network controller 102 configured to support a plurality of network applications 104. The network controller 102 may be a computer, a server, or any sort of hardware or software device that can allow an administrator to control and manage a number of access points and client devices in the network 100 from a centralized location. The network applications 104 supported by the network controller 102 may include forwarding of data packets, establishments of network policies, and creation of time schedules. The network controller 102 can be communicatively coupled to a switch 103, which directs traffic to and from one or more access points 106 that act as network edges. A network edge is an electronic device that serves as an entry point to the network 100 for client devices, such as computers, laptops, tablets, smartphones, or mobile phones. An access point 106 is a network edge that provides wireless access to the network 100. For example, an access point 106 may be a wireless router or gateway. Each access point 106 may be wireless coupled to a plurality of client devices 108. Each access point 106 may be a wireless router or any other device that can broadcast wireless signal to be accessed by a client device 108. The access points 106 may be implemented in accordance with IEEE 802.11 wireless specifications. In some examples, the network 100 can also include one or more wired devices 110 communicatively coupled to the network controller 102 through a router 112, which acts as a network edge. The wired devices 110 may also be configured for software-defined networking.

The network controller 102 can control and manage the client devices 108 through the access points 106. For example, the network controller 102 may control the transmission and reception of packets of data to and from the client devices 108. The network controller 102 may also establish a number of network policies for the client devices 108. A network policy is a set of rules, settings, or conditions that are to be followed by nodes and client devices of the network 100. In some examples, the network policy may require that each client device 108 maintains a certain quality of service (QoS) specification while wirelessly communicating with the network 100 through the access point 106.

In order to ensure that each client device 108 is able to communicate within the network with little or no contention or interference from other client devices, the network controller 102 can generate a time schedule that divides up available airtime into a number of time windows to be allocated among the plurality of client devices 108. Thus, each client device or a number of client devices 108 can only wirelessly transmit to and may only receive data packets from the network for the duration of its assigned time windows. A time window for one or more client devices 108 may be large enough so as to allow a burst transmission of a number of consecutive data packets to or from one or more client devices 108. In some examples, the length of a time window may range from 10 to 100 ms. In some examples, the implementation of a time schedule can be performed by the access point itself 106.

In some examples, a network 100 may contain a plurality of access points 106, with each access point 106 wirelessly linked to a plurality of client devices 108. Multiple client devices 108 communicating within the network 100 from multiple access points 106 within wireless proximity of each other may be a burden on wireless resources due to contention or interference between client devices wirelessly linked to different access points. To reduce contention or interference, the network controller 102 may divide up available airtime into a number of access windows to be allocated among the plurality of access points 106. Thus, in one example, each access point 106 may only enable wireless communication with its wirelessly linked client devices 108 during its assigned access windows.

Figure 2:
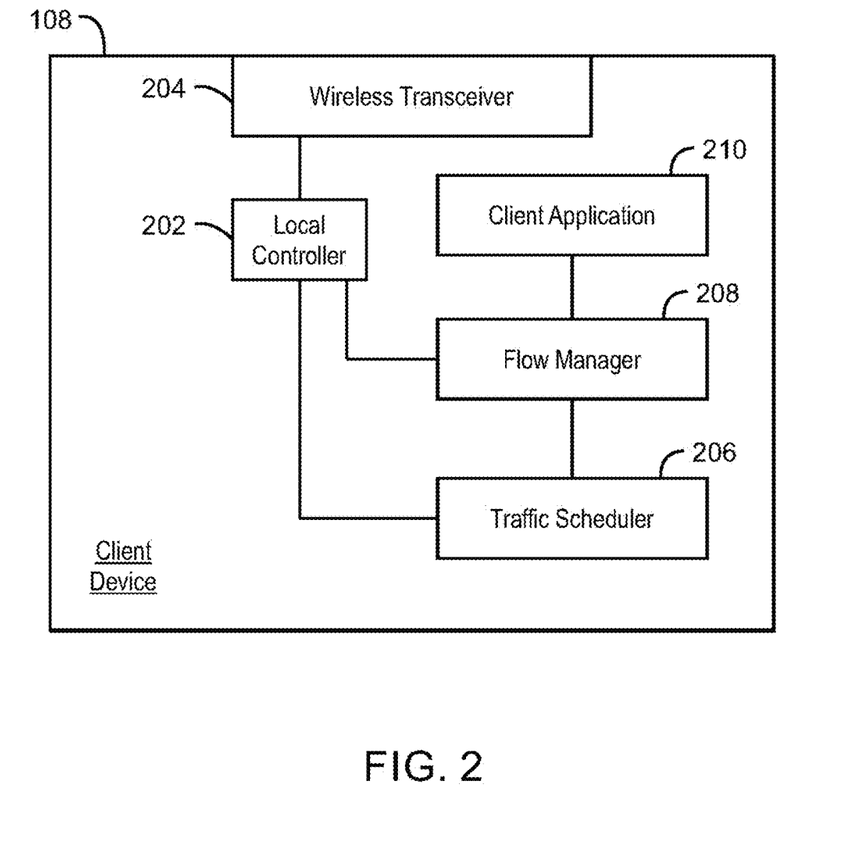
FIG. 2 is a schematic of a client device configured for wireless networking, in accordance with examples of the present disclosure.

FIG. 2 is a schematic of a client device configured for wireless networking, in accordance with examples of the present disclosure. The client device 108 can include a local controller 202 configured to interact wirelessly within a network 100. For example, the local controller 202 can wirelessly communicate with a network controller 102 in the network 100 via an access point 106. The local controller 202 may be coupled to a traffic scheduler 206 and a flow manager 208 in the client device 108. The flow manager 208 may be able to access the client device's application services 210. The client device 108 may be a desktop computer, a laptop computer, a tablet computer, a smartphone, or any other computing device that is configured for wireless networking.

In some examples, the network controller 102 can also extend an SDN application programming interface (API) to a local controller 202 on one or more client devices 108 coupled to the network 100. The SDN API may allow the network controller 102 to send information containing network policies to control the network activity, QoS, and security of the client devices 108. Examples of network policies may include controlling the network activity, QoS, rate-limiting, firewall rules or other security policies to be applied during wireless data transmission.

The local controller 202 can receive a schedule from the network controller 102 via an SDN API communicating over the wireless transceiver 204. The schedule can include one or more time windows that determine when the client device 108 is authorized to wirelessly exchange data packets with the network 100 via the access point 106. The traffic scheduler 206 can implement the schedule such that the client device 108 is queued to transmit data packets to the access point 106 at the start of the time window.

The traffic scheduler 206 may configure the client device 108 such that the wireless transmission function of the client device 108 is inactive outside of the time window. In some examples, the traffic scheduler 206 may act as a buffer between the application services 210 and the wireless transceiver 204. When the client device's time window is not active, the traffic scheduler 206 may block data packets sent from the application services 210 to the wireless transceiver 204. When the client device's time is active, the traffic scheduler 206 can flush the buffered data packets to the wireless transceiver 204.

In some examples, the client device 108 may enter a "sleep" state, or the wireless transceiver 204 may be deactivated outside of the time window. The client device 108 may be configured to automatically sleep if no outgoing data packets have been transmitted for some time. Deactivating the wireless transmission and reception function of the client device 108 outside of the time window may help conserve power and thereby also extending battery life. The traffic scheduler 206 may configure the client device 108 to reactivate wireless transmission at the start of the time window. The client device 108 may transmit a packet or an SDN API message containing a wakeup signal to the access point 106 to inform the network 100 that the client device 108 is ready to transmit or receive data packets.

The flow manager 208 can measure traffic flow data and report the data to the local controller 202. The traffic flow data may include information regarding the burst transmissions sent between the client device 108 and the access point 106. For example, the flow manager 208 can measure the number of data packets and size of data packers in a burst transmission, the QoS priorities of data packets, the time length of a burst transmission, the frequency of burst transmissions, the time between each burst transmission, the amount of radio frequency (RF) interference detected, the quality of the wireless link, or any combinations thereof during wireless communication. In some examples, the traffic flow data or a summary representation of the traffic flow data may be sent to the network controller 102 via an SDN API to be used as factors in determining the time, length and frequency of the client device's time window schedule. The flow manager 208 can also enforce network policies received from the network controller 102 via an SDN API. Examples of network policies may include QoS, rate-limiting, Call Admission Control (CAC), Network Access Control (NAC), firewall rules or other security policies to be applied during wireless data transmission.

Call Admission Control (CAC) is a method of regulating or restricting new application sessions to protect the network against excessive traffic volume and ensure certain latency or bandwidth sensitive applications such as interactive voice communications using Voice over Internet Protocol (VoIP) deliver an acceptable quality of experience (QoE) for the user. For example, an access point 106 may have a CAC limit of 15 simultaneous VoIP calls, such that when 15 active calls are established and admitted onto the access point 106, then an additional call attempt over access point 106 will be rejected or assign to a lower QoS priority than previously admitted calls. Further, any additional call attempts over access point 106 will be rejected or assigned to a lower QoS priority, until the number of active calls over access point 106 drops below the CAC limit of 15.

Network Access Control (NAC) is a solution that uses a set of protocols to define user or device authentication along with network security policies that enforces what networking resources a client device is permitted to access on the network 100. For example, a network 100 may have NAC policies configured by an administrator that allow an employee's client device wirelessly communicating with the network 100 through access point 106 to access all company owned servers and resources, while limiting a guest user's client device accessing the network 100 through access point 106 to be restricted to only Internet access.

The network policies sent from the network controller 102 via an SDN API may also include quality of service (QoS) specifications to be applied during wireless data transmission. Examples of QoS specifications may include layer 3 differentiated service code point (DSCP) values, bit rate, delay, jitter, packet-dropping probability, and bit error rate to be assigned to a number of specified applications, such as interactive voice or video conferencing. By only wireless transmitting with the network 100 during the assigned time windows and with the assigned QoS specification, the client device 108 is better able to sustain an acceptable QoE.

To allow the network controller 102 to control and manage hybrid SDN networks that include non-SDN enabled client devices 108 (e.g. client devices without an SDN API or local controller framework), the network controller 102 can instruct the access point 106 to use a combination of time schedules for SDN enabled client devices 108 along with virtual carrier sensing mechanism, like a Network Allocation Vector (NAV) mechanism to control wireless transmissions of non-SDN enabled client devices 108. The NAV is a reservation mechanism used with wireless protocols such as IEEE 802.11, which an access point 108 can use to instruct how long a client device may access the wireless medium, while restricting other client devices from accessing the wireless medium. An example of using an NAV mechanism to control wireless access of non-SDN enabled client devices is having the access point 108 send an unsolicited CTS containing the NAV duration and media access control address (MAC address) for the client device 108 that is allowed to transmit. The NAV duration instructs how long the specified client device is authorized to wirelessly communicate with the access point and how long other client devices must defer wireless access.

Figure 3:
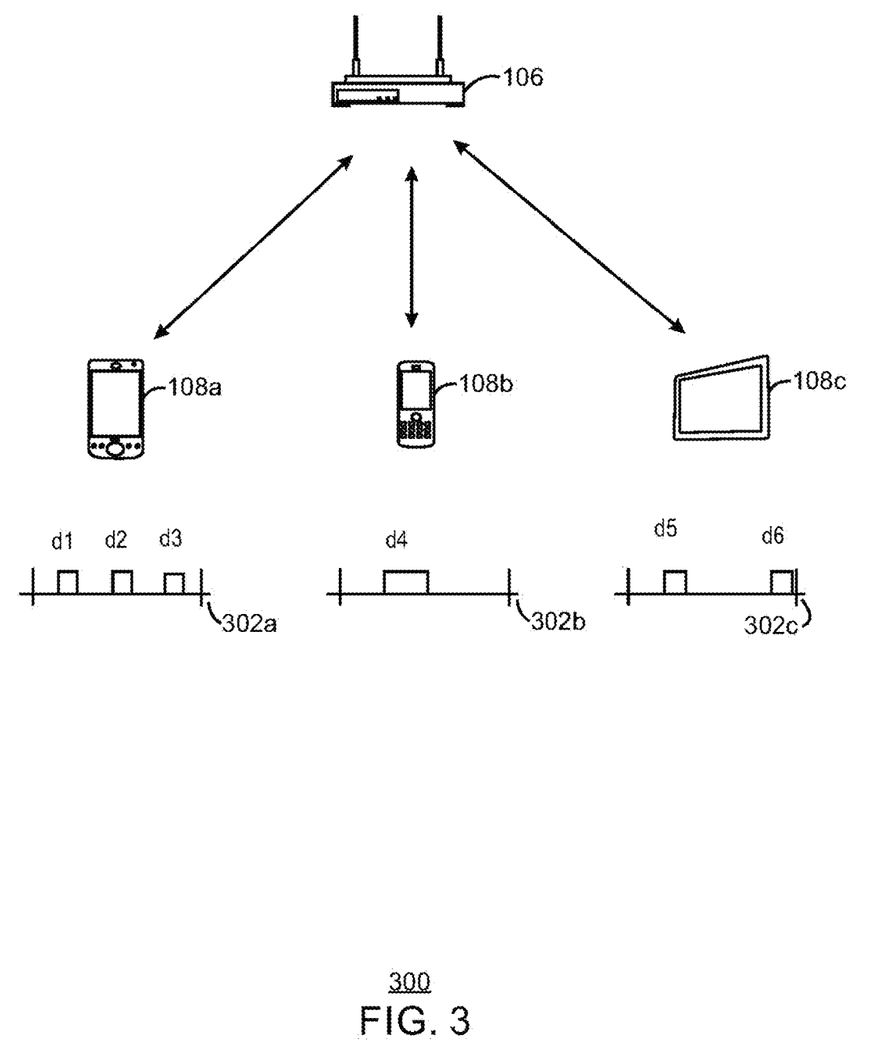
FIG. 3 is a diagram illustrating wireless communication between an access point and a plurality of client devices, in accordance with examples of the present disclosure.

FIG. 3 is a diagram illustrating wireless communication between an access point and a plurality of client devices, in accordance with examples of the present disclosure. The access point 106 can be wirelessly linked to three client devices 108. Each of the three client devices 108 is given a time schedule 302 via an SDN API that states how the client device 108 is allowed to wirelessly communicate with the access point 106. A time schedule 302 may allot one or more time windows within a period of time (or cycle) to a number of the client devices 108.

In one example illustrated in FIG. 3, a smartphone 108a may wirelessly communicate with the access point 106 during time windows d1, d2, and d3 in the smartphone's time schedule 302a. In another example illustrated in FIG. 3, a mobile phone 108b may wirelessly communicate with the access point 106 during time window d4 in the mobile phone's time schedule 302b. In another example illustrated in FIG. 3, a tablet computer 108c may wirelessly communicate with the access point 106 during time windows d5 and d6 in the tablet computer's time schedule 302c.

The time schedule can be determined using a number of inputs, including traffic flow data recorded by the client devices 108. Examples of inputs include the client device priority, QoS priority of applications running on a client device, client device traffic patterns, airtime usage of each client device in previous cycles, quality of the wireless link and any identified interference relationships between the client devices 108. The inputs can be factors used by the network controller 102 to determine how airtime and network policies are allocated. In some examples, client devices 108 with higher priority can receive larger time windows, more frequent time windows, or unshared airtime, while client devices 108 with lower priority can receive smaller time windows, less frequent time windows, or airtime shared with a number of other client devices 108. In some examples, client devices 108 that did not completely use up their allotted airtime in a previous cycle may have their time windows reduced. In some examples, client devices 108 with identified interference relationships with one another may be scheduled such that their respective time windows do not overlap. In some examples, the time schedule 302 is set such that each client device 108 is able to sustain a quality of service level specified by the network controller 102. The resulting output can be a time schedule 302 with time windows assigned to optimize the experience for specific client devices or to optimize the overall efficiency or performance of the network 100.

Figure 4:
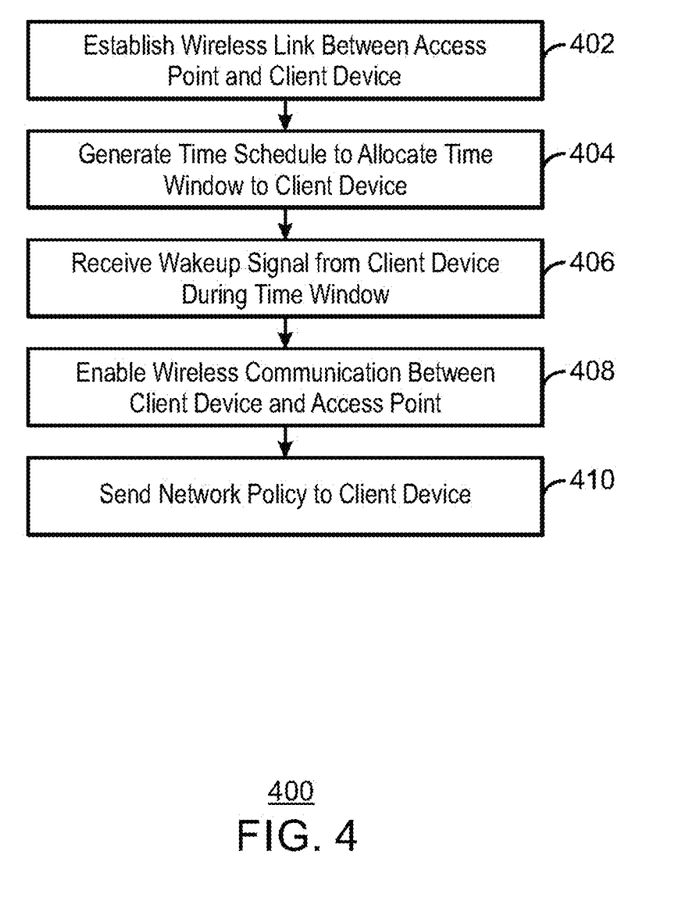
FIG. 4 is a process flow chart of a method for setting network policy in a wireless network.

FIG. 4 is a process flow chart of a method for setting network policy in a wireless network. The method 400 can be performed by a network controller of a wireless network that utilizes software-defined networking, as shown in FIG. 1.

At block 402, a wireless link is established between an access point and a client device in the network. The network may utilize software-defined networking (SDN) infrastructure. A plurality of other client devices may also be linked to the network via the access point.

At block 404, a time schedule is generated to allocate a time window to one or more client devices. The time window determines when and for how long a client device is authorized to wirelessly communicate with the network via the access point. During the time window, a client device is able to transmit data packets to and from the access point with little or no contention or interference from other devices.

At block 406, a packet or an SDN API message containing a wakeup signal is received from the client device during the time window. The wakeup signal can serve as an indicator that the client device is ready to transmit or receive data.

At block 408, wireless communication is enabled between the access point and one or more client devices. For the duration of the time window, a client device is able to communicate wirelessly with the access point with little or no contention or interference from other devices. Thus, a client device may be able to maintain a higher level of QoE. The network may receive traffic flow data from the client device via an SDN API. The traffic flow data may be used as factors to generate a future time schedule.

At block 410, a network policy is sent to the client device via an SDN API. In some examples, the network policy may be related to Call Admission Control (CAC) or Network Access Control (NAC). The network policy may include a QoS specification for wireless communication between the access point and the client device. In some examples, the QoS specification may not be achievable if the client device is experiencing wireless contention or interference from other devices during wireless transmission.

Figure 5:
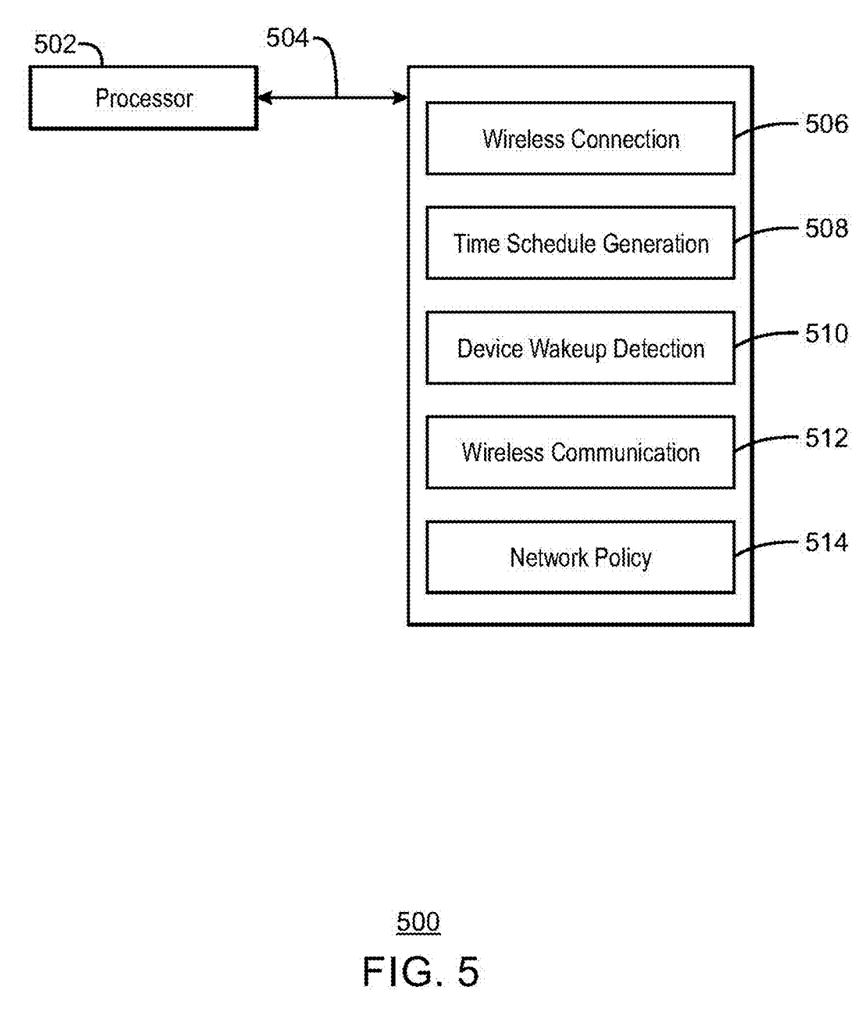
FIG. 5 is a block diagram of a tangible, non-transitory computer-readable medium containing instructions for setting network policy in a wireless network.

FIG. 5 is a block diagram of a tangible, non-transitory computer-readable medium containing instructions for setting network policy in a wireless network. The non-transitory, computer-readable medium 500 can include RAM, a hard disk drive, an array of hard disk drives, an optical drive, an array of optical drives, a non-volatile memory, a universal serial bus (USB) drive, a digital versatile disk (DVD), or a compact disk (CD), among others. The tangible, non-transitory computer-readable media 500 may be accessed by a processor 502 over a computer bus 504. Furthermore, the tangible, non-transitory computer-readable medium 500 may include instructions configured to direct the processor 502 to perform the techniques described herein.

As shown in FIG. 5, the various components discussed herein can be stored on the non-transitory, computer-readable medium 500. A wireless connection module 506 may be configured to establish a wireless connection between an access point and a client device. A time schedule generation module 508 may be configured to generate a time schedule that can allocate time windows to the client device. A device wakeup detection module 510 may be configured to receive a wakeup signal from the client device during the time window. A wireless communication module 512 may be configured to enable wireless communication between the access point and the client device. A network policy module 514 may be configured to send a network policy to the client device via an SDN API.

The block diagram of FIG. 5 is not intended to indicate that the tangible, non-transitory computer-readable medium 500 are to include all of the components shown in FIG. 5. Further, the tangible, non-transitory computer-readable medium 500 may include any number of additional components not shown in FIG. 5, depending on the details of the specific implementation.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A network controller, comprising:
   processing circuitry; and
   a non-transitory, computer-readable medium including instructions that causes the processing circuitry to:
   transmit a command to establish a wireless connection between an access point and a first client device;
   allocate a time window from a previously generated time schedule to the first client device;
   wherein the network controller is software defined networking (SDN) enabled, the wireless access point is SDN enabled, the command from the network controller is an SDN message, and the message from the network controller is an SDN message,
   instruct the access point to forward the time schedule to the client device, wherein the client device is software defined networking (SDN) enabled, and the time schedule is forwarded to the client device using an SDN application programmer interface (API);
   instruct the access point to forward data packets addressed to and sent from the first client device during the allocated time window; and
   instruct the access point to block data packets addressed to and sent from the first client device outside the allocated time window.

2. The network controller of claim 1, wherein the network controller is a software-defined networking (SDN) controller, and the transmitted command is an SDN protocol message.

3. The network controller of claim 1, wherein the allocated time window is also allocated to a second client device.

4. The network controller of claim 3, wherein the network controller instructs the access point to forward data packets addressed to and sent from the second client device during the allocated time window.

5. The network controller of claim 1, wherein the time window is determined as part of a time schedule that is generated based, in part, on at least one of: network traffic flow data, device priorities, application QoS priorities, device traffic patterns, device airtime usage, wireless link quality, and interference relationships between devices.

6. The network controller of claim 1, wherein the network controller further instructs the access point to buffer blocked data packets until the allocated time window and transmit the buffered data packets during the allocated time window.

7. The network controller of claim 1, wherein the network controller receives a message from the client device during the allocated time window indicating that the client device is prepared to transceive data packets.

8. A method for operating a wireless network, comprising:
   receiving, at a wireless access point, a command from a network controller to establish a wireless link with a client device;
   receiving, at the wireless access point, a message from the network controller including a time schedule associated with the client device; forwarding, from the wireless access point to the client device, the time schedule,
   wherein the network controller is software defined networking (SDN) enabled, the wireless access point is SDN enabled, the command from the network controller is an SDN message, and the message from the network controller is an SDN message,
   forwarding, from the wireless access point to the client device, the time schedule, wherein the client device is software defined networking (SDN) enabled, and the time schedule is forwarded to the client device using an SDN application programmer interface (API);
   based on the time schedule, blocking, at the wireless access point, data packets addressed to the client device when outside of a time window of the time schedule that is allocated to the client device;
   based on the time schedule, forwarding, from the wireless access point to the client device, data packets addressed to the client device during the time window that is allocated to the client device.

9. The method of claim 8, wherein the data packets are forwarded after a wakeup message is received from the client device.

10. The method of claim 8, wherein the client device is not SDN enabled, and the time schedule is forwarded to the client device using a network allocation vector (NAV) mechanism.

11. The method of claim 8, wherein the wireless access point has established a wireless link with another client device that is not SDN enabled, and the time schedule is forwarded to the another client device using a network allocation vector (NAV) mechanism.

12. The method of claim 8, wherein blocking the data packets includes storing the data packets in a buffer and forwarding the data packets to the client device during the allocated time window.

13. A system for operating a wireless network, comprising:
a plurality of client devices;
a wireless access point communicatively coupled to the plurality of client devices; and
a network controller to:
transmit network policies to the wireless access point to manage network traffic relating to the plurality of client devices,
generate a time schedule including allocating a time window to each of the plurality of client devices,
wherein the network controller is software defined networking (SDN) enabled, the wireless access point is SDN enabled, the command from the network controller is an SDN message, and the message from the network controller is an SDN message,
instruct the wireless access point to forward the time schedule to a first portion of the plurality of client devices using a software defined networking (SDN) mechanism and to forward the time schedule to a second portion of the plurality of client devices using a network allocation vector (NAV) mechanism, forwarding, wherein the first plurality of client devices are software defined networking (SDN) enabled, and the time schedule is forwarded to the client device using an SDN application programmer interface (API);
instruct the wireless access point to forward data packets addressed to and sent from each client device of the plurality of client devices during the allocated time window of each respective client device, and instruct the access point to block data packets addressed to and sent from each client device of the plurality of client devices outside the allocated time window of each respective client device.

14. The system of claim 13, wherein instructing the access point to block data packets comprises instructing the access point to store the blocked data packets in a buffer and forward the data packets from the buffer during the allocated time window of each respective client device.

15. The system of claim 13, wherein the first portion of the plurality of client devices are SDN enabled and the second portion of the plurality of client devices are not SDN enabled.

16. The system of claim 13, wherein the time schedule is generated based, in part, on at least one of: network traffic flow data, device priorities, application QoS priorities, device traffic patterns, device airtime usage, wireless link quality, and interference relationships between devices.

17. The system of claim 13, wherein the network controller is further to generate an updated time schedule and instruct the wireless access point to forward the updated time schedule to the plurality of client devices.

18. The system of claim 13, wherein instructing the access point to forward data packets comprises instructing the access point to forward data packets after a wakeup message is received from each respective client device.

* * * * *